United States Patent [19]

Kremer

[11] 4,226,528

[45] Oct. 7, 1980

[54] PHOTOGRAPHIC ENLARGING EASEL

[75] Inventor: Walter Kremer, Bergneustadt, Fed. Rep. of Germany

[73] Assignee: Johannes Bockemuehl, Gummersbach-Derschlag, Fed. Rep. of Germany

[21] Appl. No.: 964,940

[22] Filed: Nov. 30, 1978

[30] Foreign Application Priority Data

Dec. 6, 1977 [DE] Fed. Rep. of Germany ....... 2754193

[51] Int. Cl.³ .............................................. G03B 27/58
[52] U.S. Cl. ...................................................... 355/74
[58] Field of Search ............................... 355/72, 73, 74

[56] References Cited

U.S. PATENT DOCUMENTS

| 2,213,652 | 9/1940 | Lawrence | 355/74 |
| 2,458,648 | 1/1949 | Saunders | 355/74 |
| 2,478,314 | 8/1949 | Petty | 355/72 X |
| 2,660,919 | 12/1953 | Keinath et al. | 355/74 |

Primary Examiner—Donald A. Griffin
Attorney, Agent, or Firm—Michael J. Striker

[57] ABSTRACT

A holding device for holding a laminar photographic material, particularly in production of photographic enlargements, has a supporting member with a supporting surface arranged so that a laminar photographic material can be placed on said supporting surface from outside, and an ejecting device associated with the supporting member. The ejecting device is movable between an operative position in which it projects outwardly beyond said supporting surface in a direction transverse to the latter so as to lift the laminar material from the supporting surface, and an inoperative position in which the ejecting device does not project outwardly beyond the supporting surface in the transverse direction. The ejecting device may be formed as a two-armed ejecting member whose one arm is arranged to be urged by the user, whereas the other arm lifts the laminar material from the supporting surface in response to such urging.

2 Claims, 8 Drawing Figures

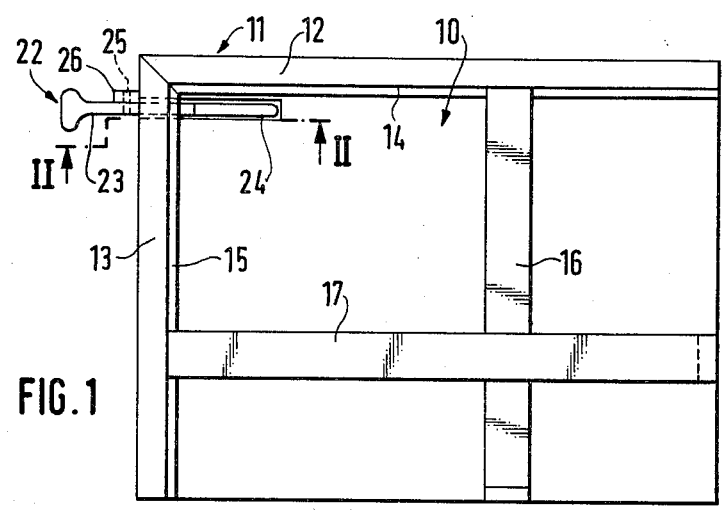
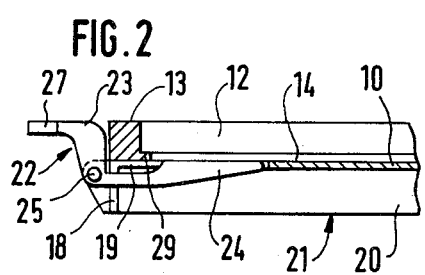
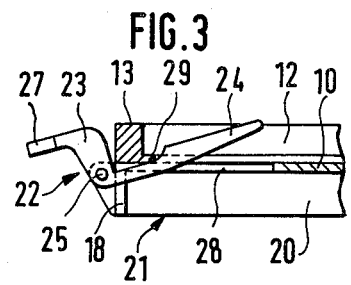
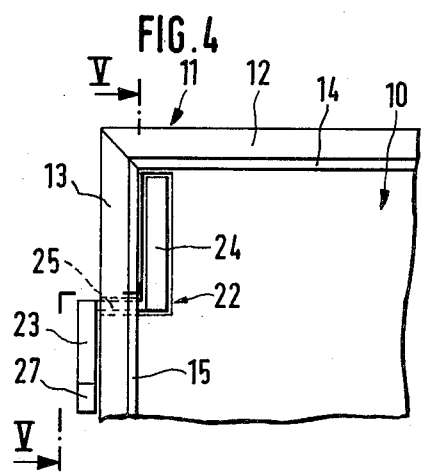
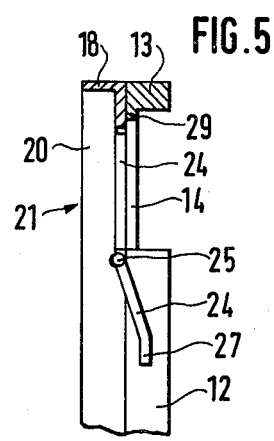

PHOTOGRAPHIC ENLARGING EASEL

BACKGROUND OF THE INVENTION

The invention concerns a device to hold laminar photographic material such as conventional printing paper, for the production of photographic enlargements.

SUMMARY OF THE INVENTION

Known devices to hold light-sensitive, printing paper use movable masks, arranged at right angles to each other, to delimit the image area. These masks are arranged on an angled frame formed of ribs, and can be moved along the frame ribs to allow production of various image sizes. This design produces enlargements with white borders, requiring subsequent trimming if borderless images are desired. For the production of borderless enlargements, borderless adapters (passe-partouts) are inserted into the enlarging frame and subsequent trimming can be obviated. Furthermore, magnetic strips can be used as adjustable delimiting members of the frame, the strips adhering to a magnetized surface holding the photographic material. Finally, inserting frames can be used for a predetermined image size, the paper being arranged within a slight recess in the frame.

With all these devices, the paper, having been exposed, must be removed from the holding surface in the dark. Frequently, the relatively thin paper, lying flat on the base, can be gripped only with difficulty, so that the sensitive surface may be damaged or marked with fingerprints. In the production of several enlargements of identical size from one negative, changing of the paper must be effected very quickly, without dislodging the enlarging frame and without having to remove a delimiting member and then repositioning it at the same location.

SUMMARY OF THE INVENTION

The object of the invention is to provide an enlarging easel from which the paper can be easily removed.

According to the invention, this object is effected by an ejector for the paper, including an operating member also serving as an actuating handle, arranged external to the holding surface, and connected by linkage to a lifting member arranged within the holding surface, whereby the lifting motion is in a direction out of the plane of the holding surface.

Thus, a device exists for the ejection of exposed paper which can be applied with the various holding devices for described above. The device requires no particular attention on the part of the operator when ejecting exposed laminar material in darkness, since, by direct or indirect pressure on the actuator handle, the lifting member will move the material into the operator's hand. The paper can then be gripped from the bottom. The invention also avoids jarring of the holding surface and dislocation of the adjustable delimiting members only vertical forces only are applied and only limited force is required.

DESCRIPTION OF PREFERRED EMBODIMENTS

According to an appropriate design of the invention, the ejector is designed as a bellcrank whereby the end of one arm serves as actuator, the other arm effecting the lifting.

Arrangement of the lifting member within the plane of the holding surface when in its resting position, is of particular advantage. Defects due to varying distance can thus be avoided since the paper will be lying completely flat upon the holding surface. In most of the holding devices presently in use, the holding surface is formed by a base plate enclosed by a frame of individual ribs at right angles to each other. In this case it will be of advantage to arrange the lifting arm of the ejector within a cut-out in the base plate, the axle of the ejector being arranged external to the frame and parallel to one frame rib. Both arms of the ejector are then aligned in the same direction.

According to another embodiment of the invention, allows ejection of the paper at a point more or less distant from the center of the picture, the axle of the ejector is arranged within the frame, and extends transversely to a frame rib so that both arms of the ejector are parallel, with the distance between them being determined by the length of the axle. Here, the lateral distance between the arms is bridged by the axle. The lifting arm can be set at a greater distance from the frame. This design is advantageous with all holding devices that do not have a frame enclosing all sides.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 shows a top view of a holding device incorporating the invention;

FIG. 2 is a section taken along line II—II of FIG. 1, with the invention in resting position;

FIG. 3 is a section of the invention shown in actuated position

FIG. 4 is a top view of a holding device incorporating a second embodiment of the actuated invention;

FIG. 5 is section along line V—V of FIG. 4.

DESCRIPTION OF PREFERRED EMBODIMENT

Figure 6:
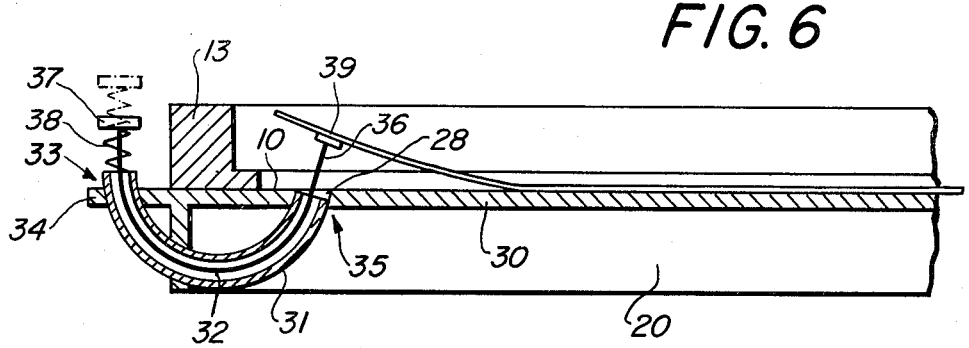
FIG. 6 is a section showing a third embodiment of the invention.

In the design shown in FIG. 1, the holding surface 10 of the axial consists of a plate upon which, photographic paper and the like, (not shown) is placed, and a frame angle 11, surrounding the plate. The frame angle to each other 11 is formed by ribs 12, 13 arranged at right angles and provided with tracks 14, 15 to hold elongated masks 16, 17, also arranged at right angles to each other and serving as delimiting members, adjustable to desired picture sizes and movable parallel to ribs 12, 13 respectively. The holding surface 10 terminates at the angled-down edge 18, running in an extension of ribs 12, 13 and provided with a slot 19. This arrangement forms a pedestal 20 for the easel and also a sub-level space 21.

A two-armed pivoting ejector 22 serves to raise the exposed paper off the holding surface 10. Here, the free end of arm 23 serves as a manually operable lever for the pivoting movement and is located outside of to the holding surface 10. The other arm 24, which raises the paper is located inside the holding surface 10. Pivoting of ejector 22 occurs about the axle 25, which axle, together with its bearing 26 is located outside the holding surface 10, as per the design shown in FIG. 1. As seen from FIGS. 1 and 2, the ejector is in the shape of an elongated Z, the lower stroke of which forms the lift arm 24, while the upper stroke has manually operable lever 27 at its end. In its resting position, the lifter arm 24 of ejector 22 forms one plane with the holding surface 10, and, as is particularly evident in FIG. 3, the lifter arm is advantageously located within a cut-out 28 of the holding surface.

Upon movement of lever 27, the ejector 22 pivots around its axle 25, arm 23 moving downwardly and lifter arm 24 rising upwardly out of the plane of holding surface 10, a portion of the lifter arm moving within the slot 19 of edge 18. In this way the paper is lifted out and can be gripped with ease. As is shown in FIG. 3, the pivotal motion of lifter arm 24 is limited by stop 29 located in the lower part of frame rib 14 at a right angle to the inner side of that rib. The Z shape of the ejector 22 makes it impossible for the lifter arm 24 to move into the sub-level space 21 and frame rib 12 serves as a travel limit for the lever arm 23. After removal of the paper, the lever returns 22 to its resting position under the influence of gravity. Alternatively, such return can also be accomplished by means of a spring.

In the second embodiment of this invention, as is shown in FIG. 4, the axle is located within the frame angle 11 and runs transversely to rib 13. In this design, the two arms 23,24 of the ejector (22) are parallel to and spaced apart from each other. In this embodiment, the spacing is determined by the length of the axle 25 which connects to arms together. The length of the axle can also be so selected that the lifter arm 24 of the ejector 22 will protrude more or less into the holding surface 10. Here, the arm 23 and the lifter arm 24 of the ejector 22 are in parallel to rib 13.

Depression of lever 27 will move arm 23 downwards, causing pivoting about fixed axle 25. In this embodiment, and only the free end of arm 24 will move out of the plane of the holding surface. With this design, a bearing for the axle 25 is not required since the axle can be located within a bore, not further shown, through the frame rib 13. The pivotal travel of arms 23, 24 is limited by stops (not shown).

FIG. 6 shows a third embodiment of the invention in which an arc-shaped hollow open ended track 31 is secured to the frame. A curved finger 32 is located inside the track and extends out of end 35 of the track into a cutout section 28 underneath the paper to be lifted. At one end of the finger a lifter 39 is located, which can lift the paper upwardly. The finger can be pressed by a button 37 located at the opposite end of the finger, and the finger is biased by a spring 38 located between the track and the button. This spring biases the finger to a position in which the paper is not lifted, preventing the paper from disturbance until the button 37 is pressed.

Figure 7:
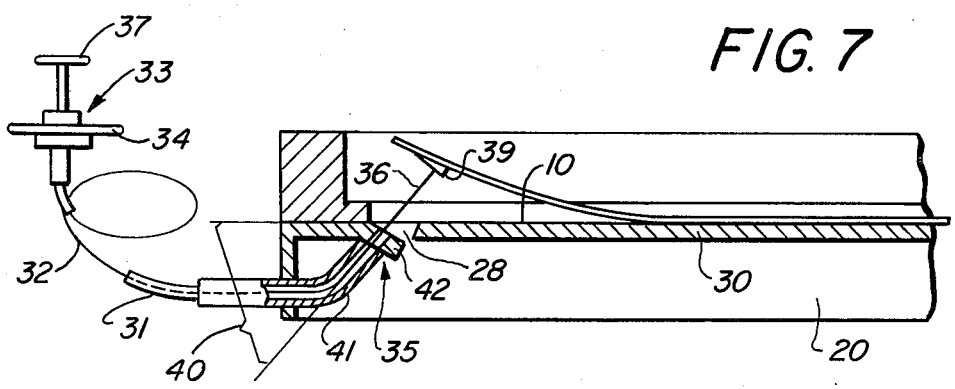
FIG. 7 is a section showing a fourth embodiment of the invention.
Figure 8:
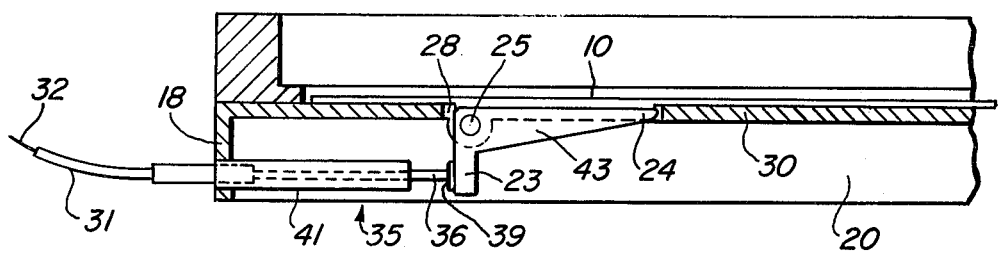
FIG. 8 is a section showing a fifth embodiment of the invention.

FIG. 7 shows a fourth embodiment of a cable releace in which end 35 of a fixed portion 41 of the cable sheath is adjacent to the frame, at stop 42. Portion 41 is inclined at angle 40 to cause the cable 32 contained therein to enter into cutout section 28 beneath the paper, there to join with lifter 39 to allow the cable to be moved. Flexible shank portion 31 is attached to portion 41 and surrounds cable 32 all the way to collar 33, which collar is embedded in plate 34 for ease in holding. The cable can be pressed by pushbutton 37. FIG. 8 shows a fifth embodiment of the invention which utilizes another cable release arrangement. Here, however, the fixed portion 41 of the sheath directs the cable to a bell crank which is pivotally secured below the paper at axle 25. The bell crank has a short arm 23 and a long arm 43, the free end 24 of the long arm forming a lifter. As in all the above embodiments, the lifter is located in cutout section 28 below the paper to be lifted. Depression of the cable release button causes the bell crank to rotate in a counter-clockwise sense as viewed in FIG. 8, raising the paper.

I claim:

1. A photographic easel for holding photographic paper and the like, comprising a supporting member having a supporting surface which is arranged so that photographic paper can be placed on said supporting surface from outside; and ejecting means associated with said supporting member and movable relative to the latter between an operative position in which said ejecting means projects outwardly of said supporting surface in a direction transverse to the latter whereby the laminar material placed on said supporting surface is lifted from the latter, and an inoperative position in which said ejecting means fails to project outwardly of said supporting surface in said transverse direction, the ejecting means including an ejecting member which has two arms and is pivotable about an axis between said operative and inoperative positions, said ejecting member having a first arm located in the region of said supporting surface and a second arm arranged to be urged in two opposite directions, so that when said second arm is urged in one of said opposite directions said ejecting member is pivoted about said axis to said operative position whereby said first arm projects outwardly beyond said supporting surface in said transverse direction and lifts the laminar material therefrom, and when said second arm is urged in the other opposite direction said ejecting member is pivoted to said inoperative position whereby said first arm does not project outwardly beyond said supporting surface in said transverse direction, and the supporting surface having a cut-out, said first arm of said ejecting member being movable between said operative and inoperative positions through said cut-out of said supporting surface.

2. A holding device as defined in claim 1, wherein said first and second arms of said ejecting member extend in one direction and are spaced from one another in a direction transverse to said one direction by a predetermined distance, said ejecting member having an axle which defines said axis of pivoting and extends between said arms so as to determine and to bridge said distance therebetween.

* * * * *